United States Patent
Schell et al.

(10) Patent No.: US 7,826,201 B2
(45) Date of Patent: Nov. 2, 2010

(54) CONTROL BOX ARRANGEMENT

(75) Inventors: Michael Schell, Dillenburg (DE); Tobias Becker, Ehringshausen (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 12/311,963

(22) PCT Filed: Nov. 30, 2007

(86) PCT No.: PCT/EP2007/010440

§ 371 (c)(1),
(2), (4) Date: Apr. 20, 2009

(87) PCT Pub. No.: WO2008/071313

PCT Pub. Date: Jun. 19, 2008

(65) Prior Publication Data

US 2010/0027196 A1 Feb. 4, 2010

(30) Foreign Application Priority Data

Dec. 12, 2006 (DE) .................. 10 2006 058 778

(51) Int. Cl.
*H02B 1/04* (2006.01)
*H02B 1/21* (2006.01)

(52) U.S. Cl. ............... 361/611; 361/608; 361/614; 361/624; 361/641; 439/152; 439/212; 439/372

(58) Field of Classification Search .............. 361/600, 361/601, 605, 608, 611, 620, 624, 637, 639, 361/648, 650, 623, 667, 673, 832; 174/50, 174/71 B, 72 B, 99 B, 129 B, 88 B, 88 R, 174/48, 52.1, 53–56, 66, 68.2; 439/152, 439/212, 372, 527, 530; 312/223.1, 223.2, 312/329, 223.6; 200/168 K, 50.01, 50 AA, 200/50 A, 48 R, 48 V, 485 B, 166 R; 307/147, 307/151
See application file for complete search history.

(56) References Cited

U.S. PATENT DOCUMENTS 2,319,415 A * 5/1943 Lightfoot .................. 361/610

(Continued)

FOREIGN PATENT DOCUMENTS

DE           3243079 A  * 11/1982

(Continued)

OTHER PUBLICATIONS

Co-Pending U.S. Appl. No. 12/448,240, filed Jun. 12, 2009; inventors Michael Schell et al.; title Control Box Arrangement.

(Continued)

*Primary Examiner*—Michael V Datskovskiy
(74) *Attorney, Agent, or Firm*—Pauley Petersen & Erickson (57) ABSTRACT

A control box arrangement including at least one control box which is sub-divided, or which can be sub-divided, into a plurality of cuboid compartments, including functional compartments, by wall sections, where vertical wall sections with a horizontal sub-division are provided. A collecting bar arrangement including a distributing bus bar arrangement guides the current, in order to supply electrical energy to appliance components which are arranged in the functional compartments accessible from the front side. An advantageous arrangement of functional compartments and the energy supply of components received therein is achieved by the distribution buses of the distributing bus bar arrangement are guided through a plurality of vertical functional compartments arranged one above the other and separated by horizontal partition bottoms, are mounted inside the compartments, and covered in a protected manner.

21 Claims, 8 Drawing Sheets

U.S. PATENT DOCUMENTS

| | | | | |
|---|---|---|---|---|
| 2,359,247 | A | * | 9/1944 | Rowe .......................... 361/608 |
| 2,648,032 | A | * | 8/1953 | Mekelburg .................. 361/608 |
| 3,041,506 | A | * | 6/1962 | Schlessel et al. ........... 361/608 |
| 3,066,244 | A | * | 11/1962 | Defandorf et al. ........... 174/560 |
| 3,096,131 | A | * | 7/1963 | Adams ....................... 439/212 |
| 3,113,820 | A | * | 12/1963 | Norden ....................... 439/114 |
| 3,142,003 | A | * | 7/1964 | Olashaw .................... 361/608 |
| 3,168,683 | A | * | 2/1965 | Brokaw ...................... 361/608 |
| 3,170,092 | A | * | 2/1965 | Adams et al. .............. 361/608 |
| 3,300,751 | A | * | 1/1967 | Fraley ........................ 439/372 |
| 3,469,149 | A | * | 9/1969 | Paape ........................ 361/624 |
| 3,478,299 | A | * | 11/1969 | Cinatl et al. ................ 439/251 |
| 3,482,143 | A | * | 12/1969 | Bugni et al. ................ 361/608 |
| 3,495,135 | A | * | 2/1970 | Paape ........................ 361/608 |
| 3,626,253 | A | * | 12/1971 | Sturdivan .................... 361/608 |
| 3,708,725 | A | * | 1/1973 | Burton et al. ............... 361/657 |
| 3,710,198 | A | | 1/1973 | Burton |
| 3,840,785 | A | * | 10/1974 | Olashaw .................... 361/614 |
| 3,855,504 | A | * | 12/1974 | Olashaw .................... 361/614 |
| 3,924,161 | A | * | 12/1975 | Olashaw et al. ............ 361/611 |
| 4,024,441 | A | * | 5/1977 | Coyle et al. ................. 361/624 |
| 4,025,826 | A | * | 5/1977 | Wilson et al. ............... 361/624 |
| 4,038,585 | A | * | 7/1977 | Wolski et al. ............... 361/624 |
| 4,142,224 | A | * | 2/1979 | Wilson et al. ............... 361/641 |
| 4,178,624 | A | * | 12/1979 | Wilson et al. ............... 361/611 |
| 4,180,845 | A | * | 12/1979 | Shariff et al. ............... 361/624 |
| 4,180,846 | A | * | 12/1979 | Wilson et al. ............... 361/643 |
| 4,199,655 | A | * | 4/1980 | Shariff et al. ............. 174/72 B |
| 4,305,114 | A | * | 12/1981 | Takagi et al. ................ 361/614 |
| 4,316,234 | A | * | 2/1982 | Takagi et al. ................ 361/614 |
| 4,740,864 | A | * | 4/1988 | Stanfield et al. ............ 361/611 |
| 4,768,967 | A | * | 9/1988 | Fritsch ....................... 439/152 |
| 5,654,871 | A | * | 8/1997 | Wentler et al. .............. 361/622 |

FOREIGN PATENT DOCUMENTS

| | | |
|---|---|---|
| DE | 40 13 379 C1 | 4/1990 |
| DE | 10 2004 054 173 A1 | 5/2006 |
| WO | WO9630980 A * | 10/1996 |

OTHER PUBLICATIONS

Co-Pending U.S. Appl. No. 12/448,236, filed Jun. 12, 2009; inventors Michael Schell et al.; title Control Box Arrangement.

Co-Pending U.S. Appl. No. 12/448,228, filed Jun. 12, 2009; inventors Michael Schell et al.; title Control Box Arrangement.

* cited by examiner

CONTROL BOX ARRANGEMENT

BACKGROUND OF THE INVENTION

1. Field of the Invention

This invention relates to a switchgear cabinet arrangement, having at least one switchgear cabinet which, by wall sections, is or can be divided into several cube-shaped partial spaces, including functional spaces, to which end vertical wall sections with horizontal divisions are provided, and wherein a bus bar arrangement, including a distribution bus bar arrangement, conducts electrical current to provide device components, which are arranged in functional spaces accessible from the front, with electrical energy.

2. Discussion of Related Art

A switchgear cabinet arrangement with a switchgear cabinet whose interior is divided into several partial spaces, is taught by German Patent Reference DE 10 2004 054 173 A1. An apparatus space of this known switchgear cabinet, which is accessible from the front for installing electrical devices, is separated by vertical separating walls from a cable connector space arranged laterally next to it and from a bus bar space arranged behind it in a rear area of the switchgear cabinet interior. In horizontal cross section, the partial spaces thus separated from each other extend over an entire height of the switchgear cabinet interior. The apparatus space is separated from the bus bar space by a separating wall having a vertical front wall section and a vertical rear section spaced apart from the former, wherein the front wall section and the rear section are divided into partial sections of different height, which are separated by horizontal separating lines. Vertical distribution bus bars are conducted between the front and rear wall sections, to which inserts can be connected through openings by connecting lugs for electrical contact. Another spatial division of the switchgear cabinet interior is not represented, except for different cabinet heights.

German Patent Reference DE 40 13 379 C1 shows a switchgear cabinet arrangement with a switchgear cabinet, where the interior can be divided in different ways into several partial spaces arranged horizontally above each other, while no detailed information is provided regarding electrical energy supply for the installed devices.

SUMMARY OF THE INVENTION

One object of this invention is to provide a switchgear cabinet arrangement of the type mentioned above but with the least possible assembly cost outlay, which makes possible different interior space arrangements, along with which a simple construction of the energy supply device is also achieved.

This object is attained with a switchgear cabinet having characteristics taught in this specification and in the claims. In this connection, distribution bus bars of the distribution bus bar arrangement are conducted through several functional spaces, which are arranged vertically above each other and are separated from each other by horizontal space divider floors, and are mounted in the interior of these spaces and are covered in a touch-proof manner.

Different functional spaces are made available to the user with these measures for the installation of device components, along with satisfactory energy supply, from which a simple assembly results and a construction with low voltage devices is also offered. It is possible to position the device components which are to be supplied with electrical energy easily and variably.

In this case, those measures are of advantage for the design and assembly, wherein the functional spaces have rear walls which embodied as mounting plates, which are spaced apart from a rear wall of the respective switchgear cabinet in order to form a reception space for a main bus bar arrangement of the bus bar arrangement in the rear interior area of the switchgear cabinet, in which main bus bars are mounted and are electrically connected with the distribution bus bars.

The variability of the space division provides for mounting plates of the same or different height, whose dimensions with respect to height and width are matched to the height and width of the functional spaces.

The structure of the functional spaces is aided if the partial spaces are closed off laterally by lateral wall sections matched to the height of the functional spaces.

For mounting and accessibility, cutouts can be arranged in the rear edge area of the space divider floors, through which the distribution bus bars are conducted.

Here, those measures contribute to simple assembly, in which the cutouts are matched to the extension of the area of the distribution bus bars in the direction of width and depth, including the touch-protection covering.

Mounting and installation are also aided if the distribution bus bar arrangement is received in a trough-like support having holding strips extending along the vertical edges and is fixed in place by horizontally extending bus bar holders, and the covers, which are applied from the front, are fixed in place on the holding strips by lateral parts having snap-in elements.

Further advantageous measures for design and mounting include the connection between main bus bars and distribution bus bars is provided by laminated copper bars and connecting clamps, by bolts, or by flexible conductors and connecting clamps. The mounting plates have cutouts for passing the copper bars or flexible conductors through, and the cutouts are closed off by cable bushings or insulating material.

Further mounting advantages with variable design possibilities result if, for receiving the space divider floors, mounting elbows extending laterally in the depth direction are attached to the vertical frame legs and/or the lateral sections and, if required, to the vertical mounting bars, by vertical legs, wherein the space divider floors are attached to horizontally oppositely oriented legs of two mounting elbows, which are located opposite each other at the same height.

Installation is aided if the horizontal legs of the mounting elbows project inward past or beyond the oppositely directed insides of the front vertical frame legs, and if the width of the space divider floors at most corresponds to the clear distance between the insides of the front vertical frame legs.

The modular design of functional spaces of different sizes and/or different arrangements is also aided if the functional spaces are provided at their front with partial doors matched to their height, and/or that a front door, which extends over all functional spaces, is attached.

Simple and unequivocal mounting is aided if the height of the lateral wall sections, of the mounting plates and, if desired of the partial doors, is matched to a grid measurement of rows of fastening holes in the vertical frame legs, and/or of the vertical mounting bars.

BRIEF DESCRIPTION OF THE DRAWINGS

This invention is described in view of exemplary embodiments, making reference to the drawing, wherein.

DETAILED DESCRIPTION OF THE INVENTION

Figure 1:
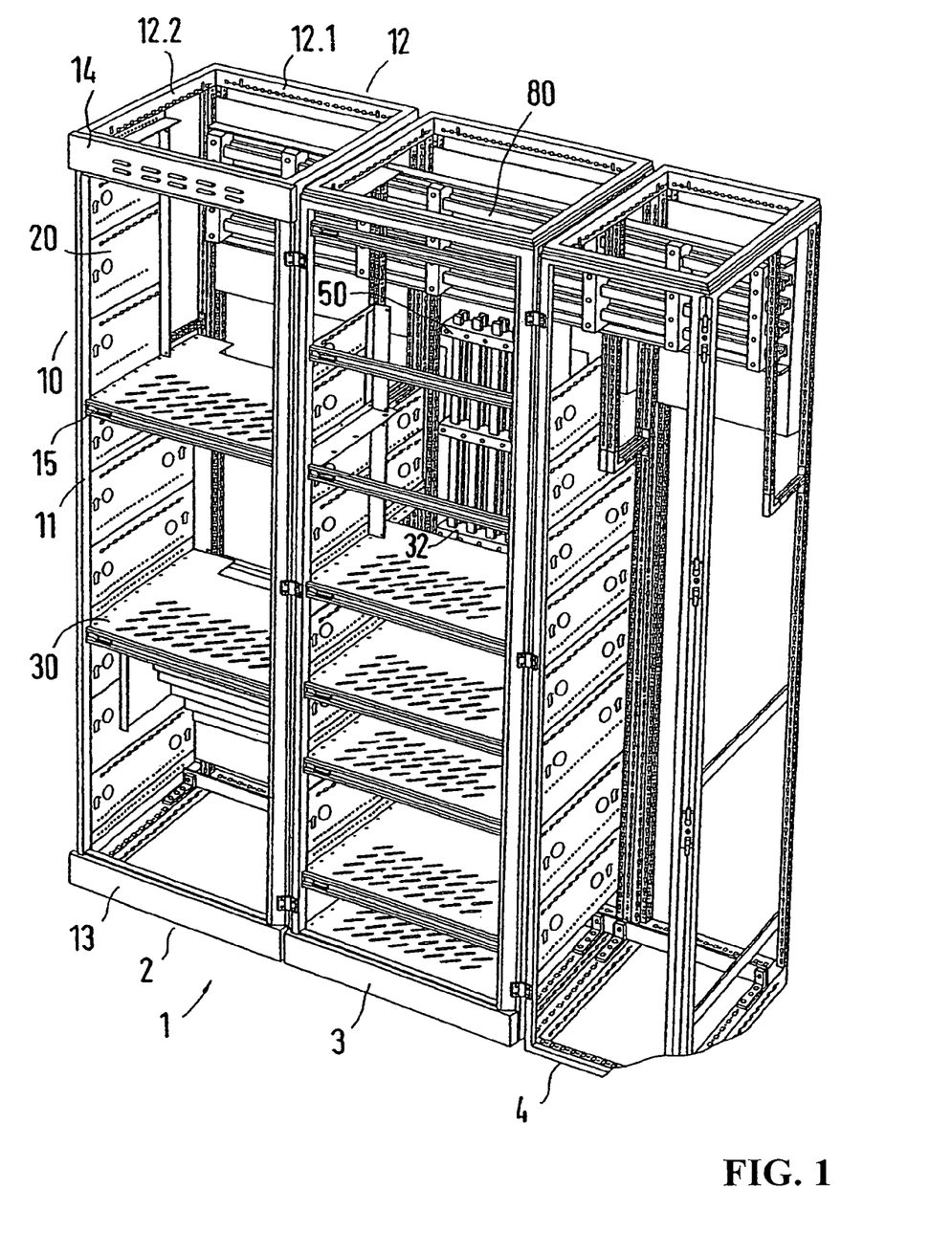
FIG. 1 is a switchgear cabinet arrangement with the doors removed and wall elements partially removed, having several functional spaces, in a perspective plan view.

FIG. 1 shows a switchgear cabinet arrangement 1 having several switchgear cabinets 2, 3, 4, with respective racks laterally lined up, wherein the right switchgear cabinet has a width which is less than the two other switchgear cabinets 2, 3 and only has an interior which extends continuously from the bottom to the top, while the other two switchgear cabinets 2, 3 have several partial spaces 5, located horizontally on top of each other, in the form of functional spaces of different height. A main bus bar system with several horizontally extending bus bars is arranged in the rear area of the switchgear arrangement 1, while vertical distribution bus bars are arranged in the center switchgear cabinet 3 and are connected with the main bus bars by electrically conducting connecting elements matched to the electrical current conducting properties. The distribution bus bars extend vertically through several functional spaces and are mounted on the front of rear wall sections in the form of mounting plates 40 assigned to the functional spaces by appropriate bus bar holders, and are accessible from the direction of the interior of the functional spaces. Appropriate adapters for the connection of device components are placed in a contacting manner on the distribution bus bars. Gaps between the device adapters are closed in the direction toward the interior of the functional spaces and are protected against being touched by insulating covers. The distribution bus bars extend through several functional spaces arranged on top of each other, wherein corresponding cutouts 32 are provided in the rear area of horizontal space divider floors 30, see also FIGS. 6 and 14, which are matched to the dimensions of the distribution bus bars with the covers.

Figure 12:
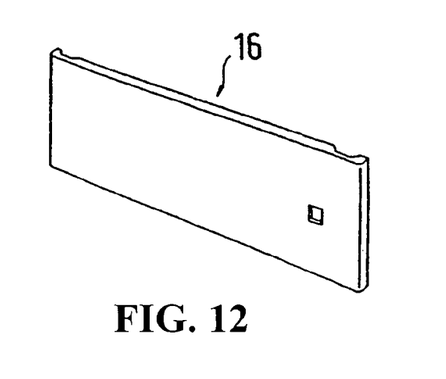
FIG. 12 shows a partial door, in a perspective plan view.

FIG. 1 shows that the switchgear cabinets 2, 3, 4 have racks 10 with four vertical frame legs 11 arranged in the corner areas and cover frames with frame legs 12.1, or respectively 12.2, extending in the direction of width and direction of depth. The switchgear cabinets 2, 3, 4 have respective bases 13. Separating strips 15, which are U-shaped in cross section, are arranged in the area of the front edge of the space divider floors 30, whose open sides are oriented toward the front, wherein the free ends of the lateral legs 15.1, 15.3, are flush with the front ends of the vertical frame legs 11, or the front level of the rack 10. An upper front screen 14 is applied to the front of the cover frame 12. Either a front door extending from the top to the bottom, or partial doors, which are assigned to the respective functional spaces and are matched in height, see FIG. 12, are provided for closing the fronts of the switchgear cabinets, and are hingedly seated by complementary hinge elements in hinge elements 16.1 attached to the front frame legs 11, and can be separately locked by locking members 16.2 attached to respectively assigned, oppositely arranged vertical frame legs 11.

The partial spaces 5 located horizontally on top of each other in the form of functional spaces are laterally bordered by lateral wall sections 20, matched to the height of the functional spaces and whose front vertical frame area is attached to vertical frame legs 11 located there, and with a rear frame area attached either to the rear vertical frame legs 11 or to vertical mounting legs arranged in the plane of the rear wall sections of the functional spaces. In addition to the lateral wall sections 20 laterally delimiting the functional spaces, the respective switchgear cabinets 2 or 4 are closed off by continuous outer lateral walls, the same as the rear of the cabinet arrangement 1, as well as its top.

Figure 9:
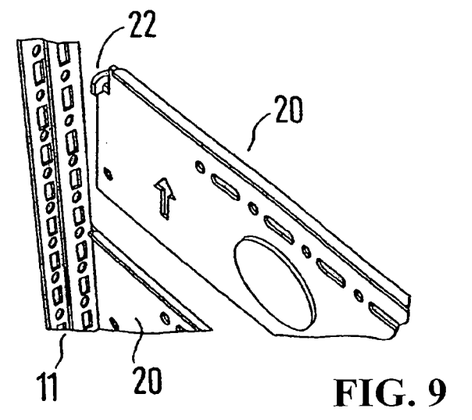
FIG. 9 shows a lateral wall area of a switchgear cabinet with a released lateral wall section, in a perspective plan view.
Figure 10:
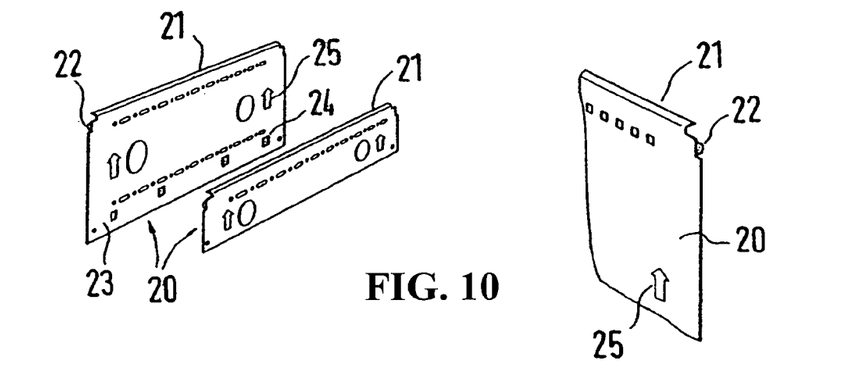
FIG. 10 shows two lateral wall sections of different height in a perspective plan view, and an enlarged partial view of a lateral wall section in a corner area.
Figure 11:
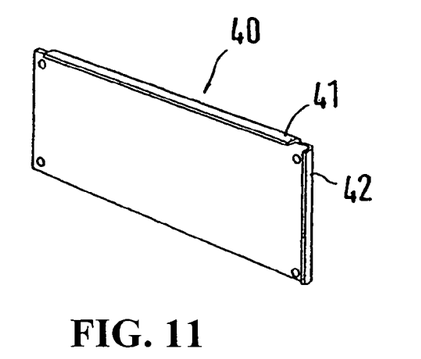
FIG. 11 shows a partial mounting plate, in a perspective plan view.

At their upper edge area, the lateral walls 20 are initially obliquely angled off at an obtuse angle in the direction of the interior and upward in relation to the functional space, and then again outwardly and toward the top parallel with the upper edge, as can also be seen in FIGS. 9 and 10. A bent-off hook element 10, which projects outward from the plane of the lateral wall section 20, is arranged in the upper edge area, is matched to the length over vertically oriented elongated holes in the respective vertical frame leg 11, or mounting leg, and can be suspended in these by a downward pointing holding protrusion. In this case, the vertical frame legs 11 can have an inner lateral mounting plane delimiting the front frame section of the rack 10, and an outer lateral mounting plane, which is located facing away from the front and is outwardly laterally offset and also faces the inside of the frame leg 11, wherein both the inner, as well as the outer mounting planes of the frame vertical legs 11 have fastening screws. The lateral wall sections 20 are preferably suspended by the hook elements in the outer, laterally offset mounting plane, wherein the vertical mounting leg also has a corresponding row of fastening holes in the corresponding plane. In addition to the hook elements 22, fastening holes are arranged in the lower front and rear corner areas of the lateral wall sections 20, which are congruent with fastening openings in the vertical frame leg 11, or the respective vertical mounting legs, and make possible a screw connection for securing. Also, the lateral wall sections 20 have a horizontally extending hole arrangement 24 in their lower edge area 23 and, if desired, also in their upper edge area 21, or respectively the upper area. For correct upward orientation with respect to the upper edge, which is bent off in the manner described above, each of the lateral wall sections 20 has alignment markers 25 in the shape of an upwardly pointing arrow. For lateral accessibility, for example to a cable space arranged next to them, they have an opening which can be covered by a removable plate or can be punched out along a perforation. In their height, the lateral sections 20 are matched to the height of a functional space, preferably in a predetermined raster size, in particular corresponding to a whole-number multiple of height units HE. In this case, lateral wall sections 20 of different height can be provided to form functional spaces of different height.

The heights of the partial mounting plates 40 and of the partial doors 16 are also correspondingly matched at a defined raster distance to the height of the functional spaces, in particular in accordance with whole-number multiples of height units, so that a sort of a building kit system results for constructing desired functional spaces, which can be arranged in accordance with the rows of holes and their raster in the vertical frame legs 11, as well as the vertical mounting legs, also at different heights of the switchgear cabinet interior.

Figure 13:
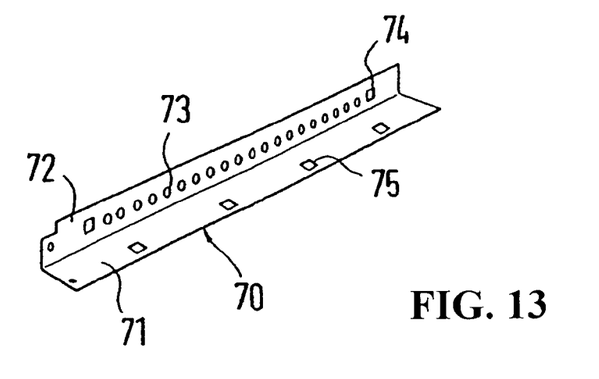
FIG. 13 shows a mounting elbow, in a perspective plan view.
Figure 14:
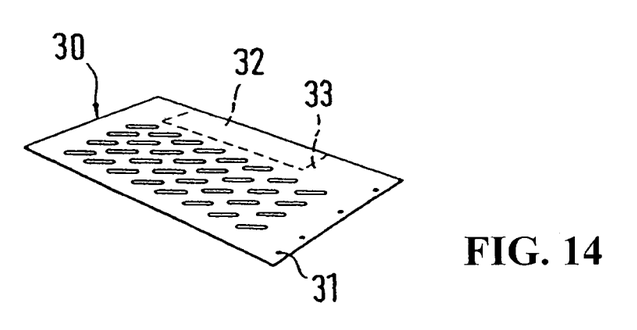
FIG. 14 shows a space divider floor, in a perspective plan view.

For arranging the space divider floors 30, mounting elbows 70 are provided, which can be laterally attached to the lateral wall sections 20 and/or the vertical frame legs 11, or respectively the vertical mounting legs, and extend with a vertical leg 72 along the appropriate lateral wall section 20 and protrude with their horizontal leg 71 in the direction toward the interior of the cabinet chamber, wherein two facing horizontal legs 71 receive a space divider floor 30 on their top, which can be connected by elements, in particular screws, engaging openings in a row 73 of holes, or of a hole arrangement 31, see FIGS. 13 and 14. In this case, the horizontal legs 71 project past or beyond the inner mounting plane of the vertical frame legs 11 into the interior, and the dimension of the space divider floor 30 in the direction of its width is advantageously at most as wide as the distance between two facing interior mounting planes, so that the space divider floors 30 can be introduced into the switchgear cabinet interior without difficulties and fixed in place on the mounting elbows 70, in which case the cutout 32 is also fittingly positioned relative to the distribution bus bars.

Figure 2A:
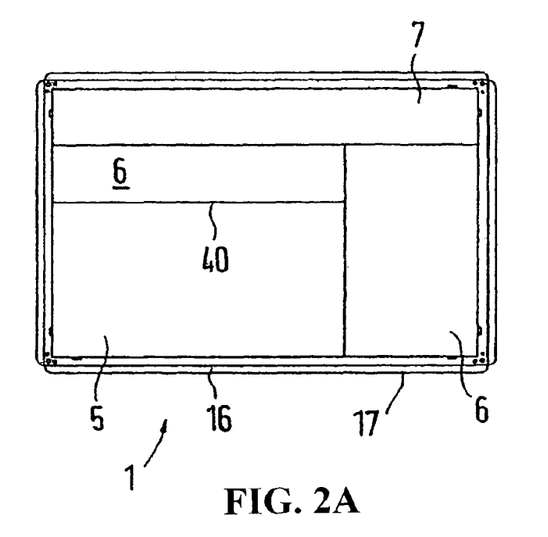
FIGS. 2A and 2B show a switchgear cabinet arrangement with a switchgear cabinet having several partial spaces formed by vertical separating walls in a top view, and with several horizontally divided partial spaces in a front view with partial doors.
Figure 2B:
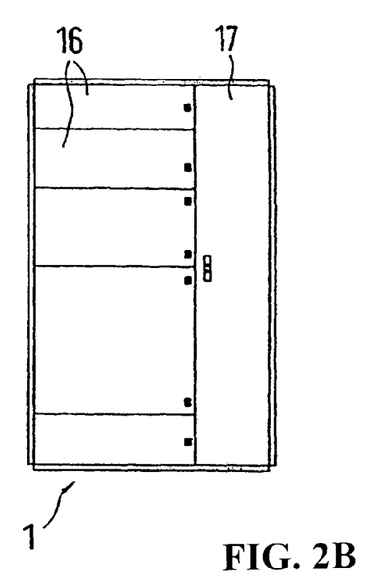

FIGS. 2A and 2B show space division options for the interior of a switchgear cabinet, one in the horizontal direction by vertical separation walls, and the other in the vertical direction by the horizontal space divider floors 30.

Figure 3:
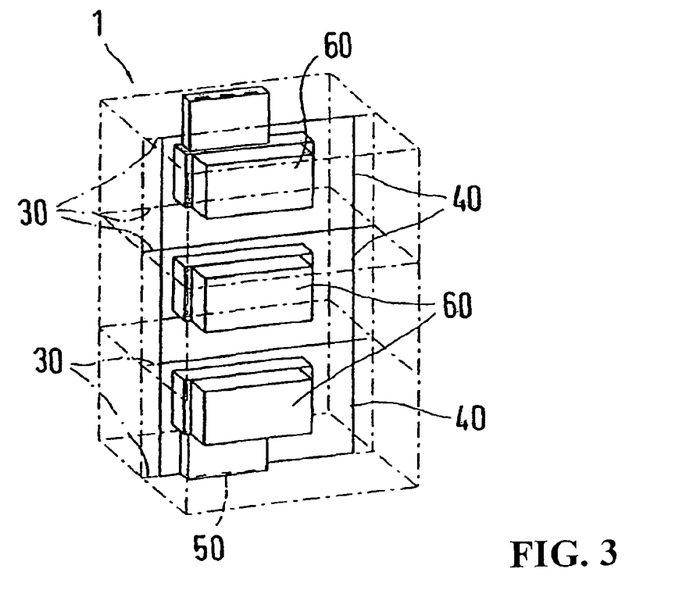
FIG. 3 shows a see-through representation of a switchgear cabinet with horizontally separated partial spaces, a distribution bus bar system and connected device components, in a perspective plan view.
Figure 4:
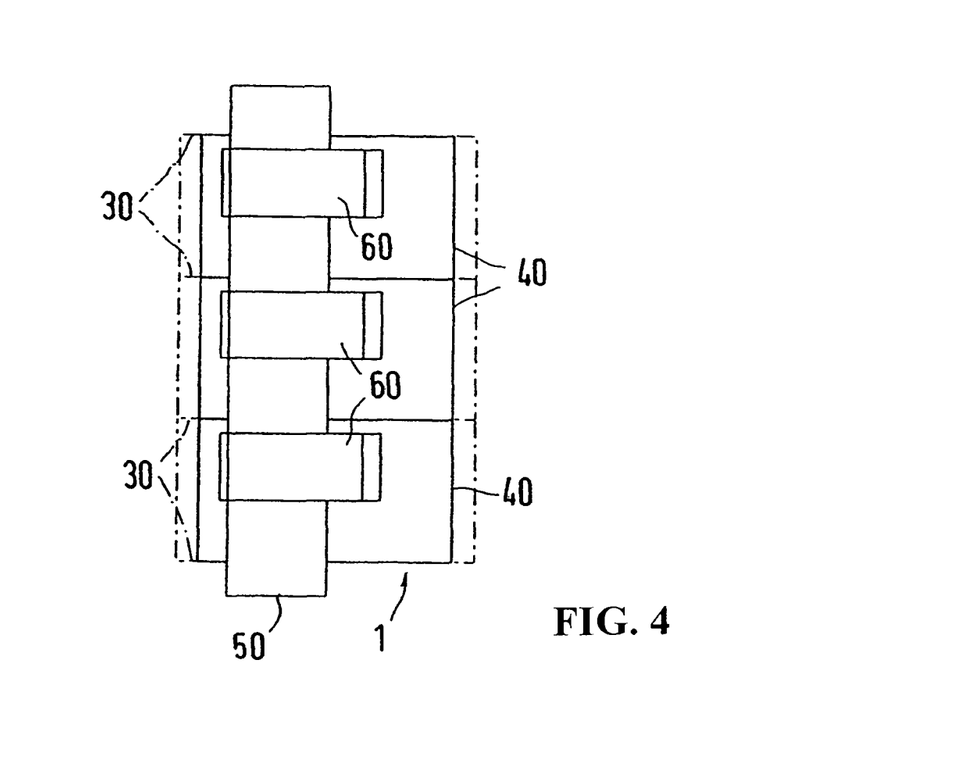
FIG. 4 shows the embodiment in accordance with FIG. 3, in a front view.
Figure 5:
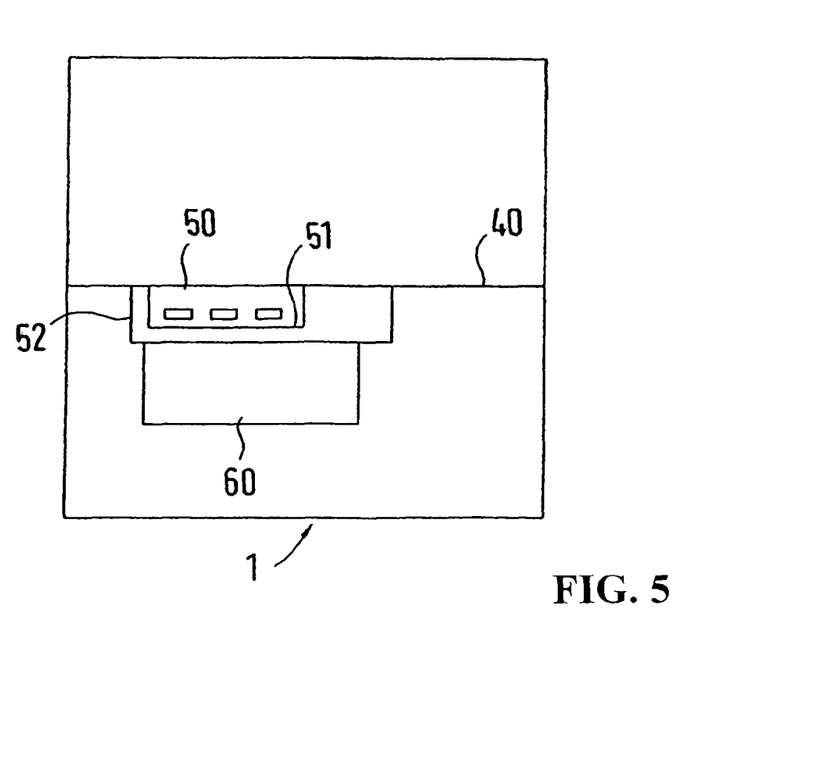
FIG. 5 shows the embodiment in accordance with FIG. 3, in a top view.
Figure 6:
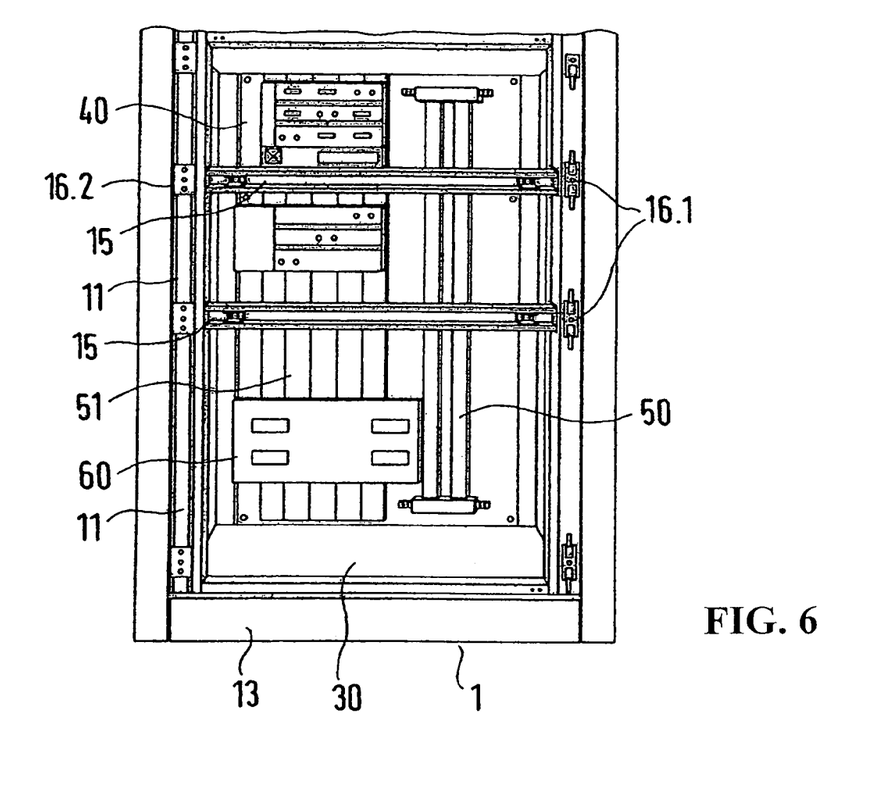
FIG. 6 is a partial view of a switchgear cabinet with several functional spaces horizontally separated from each other, in a perspective front view with a distribution bus bar system.
Figure 7:
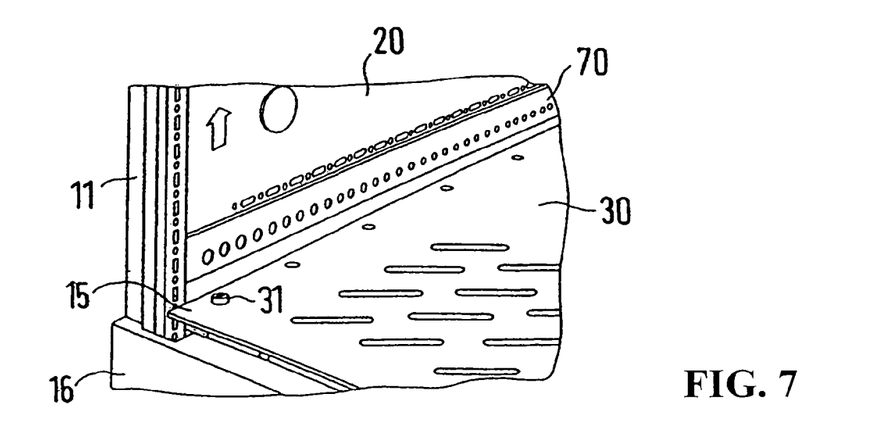
FIG. 7 is a partial view of a switchgear cabinet in a corner area of a partial space in a form of a functional space, in a perspective plan view.
Figure 8:
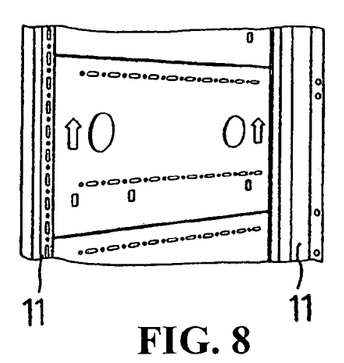
FIG. 8 is a lateral wall area of a switchgear cabinet from an inside and with lateral wall sections.

FIGS. 3, 4, 5 show the distribution bus bar arrangement 50 with the bus bar covering 51 and device adapters 52 placed on top of the bus bar arrangement 50, as well as switching devices 60 connected with it. FIG. 6 also shows the arrangement of the distribution bus bars 50 extending through several functional spaces and their passage through the cutouts 32 in the rear area of the space divider floors 30. As FIG. 14 shows, the cutout 32 can be prepared for simple punching out by a perforation 33 in the rear edge area of the space divider floor 30, so that the cutout 32 is open toward the rear edge of the space divider floor 30, so that it is thus possible later to easily arrange the space divider floor 30 at any arbitrary height of the switchgear cabinet interior and it can also be removed again without it being necessary to remove the distribution bus bar arrangement 50.

As FIG. 13 shows, it is possible for the mounting elbow 70 to be suspended in the hole arrangement 24 of the respective lateral wall section through fastening holes 74, 75, or possibly to be connected therewith, if required, by hook-shaped straps bent out in the direction toward the rear facing away from the interior.

Figure 15:
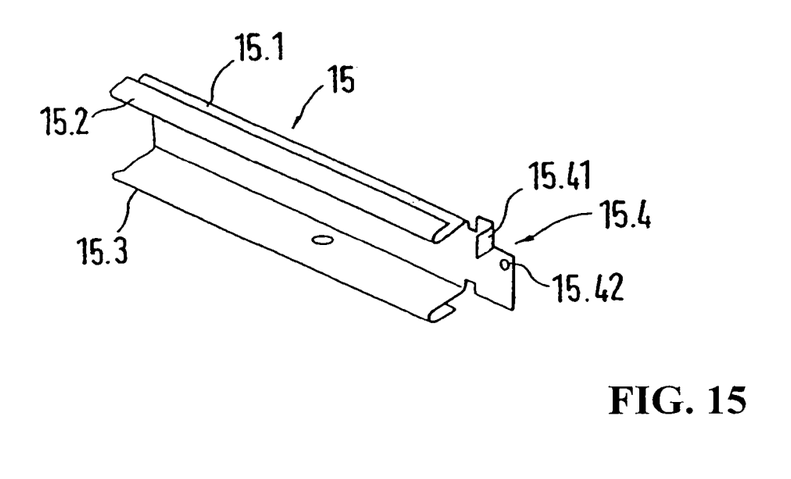
FIG. 15 shows a section of a separating strip, in a perspective plan view.

As FIG. 15 shows, the U-shaped separating strips 15 have lateral fastening sections 15.4, on both sides, in the extension of their base strip 15.2 which, in the installed state, extend behind shoulders on the rear of the vertical frame legs 11 and are fastened on their rear by screws introduced through fastening openings. It is possible to form free areas and bent-back holding elements 15.41 in the corner area of the fastening sections 15.4.

Figures 16, 17, 18:
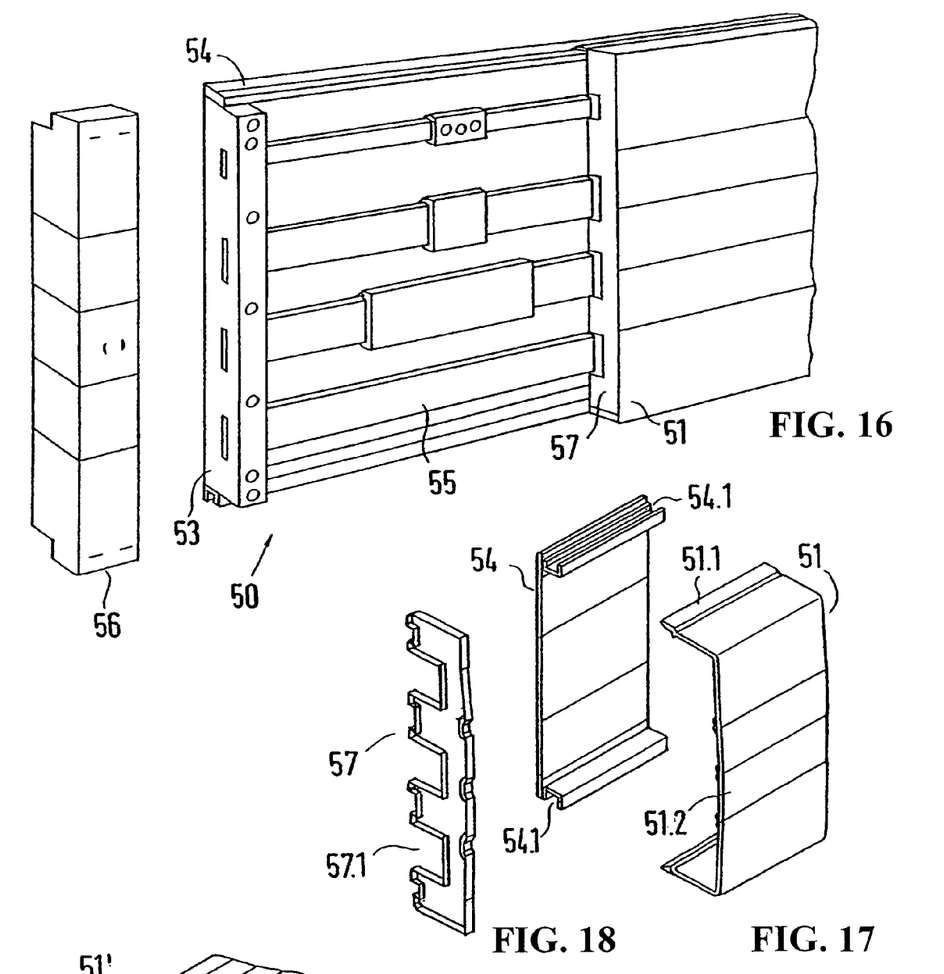
FIG. 16 shows partial views of a structure of a bus bar arrangement of a main bus bar arrangement and/or a distribution bus bar arrangement, in a perspective plan view.
FIG. 17 shows partial views of a bus bar support and a bus bar cover, in an exploded perspective plan view.
FIG. 18 shows a support screen for a bus bar arrangement, in accordance with FIG. 16.

FIG. 16 shows a bus bar arrangement, for example the distribution bus bar arrangement 50, in which a construction similar to a main bus bar arrangement 80, see FIG. 1, can be employed. The bus bars, here the distribution bus bars 55, are received in a trough-shaped bus bar support 54, U-shaped in cross section, and having a bottom part of a relatively wide extension in accordance with the arrangement of the bus bars and with relatively low edges in comparison. The edges are designed as holding strips 54.1 with holding structures in order to snap-on, or snap-in, the covering 51, which extends over the entire width of the bus bar support 54, by corresponding counter-structures, wherein the distribution bus bars 55 are covered by a cover element 51.2, and the counter-structures are formed on lateral elements 51.1 laterally protruding from the cover element.

An insulating, touch-proof cover of the bus bars, or respectively distribution bus bars 55, is thus obtained, for example, to be matched to free areas between adapters placed on the bus bars. In order to obtain a seal, and also a support in the end area of the cover 51 also at the front in the area between the cover element 51.2 of the covering 51 and the bus bars, as well as the bottom portion of the bus bar support, a support screen 57 is provided, which is matched to the cross section of the space between the covering and the bus bar support and has cutouts 57.1 for the bus bars, as shown in FIGS. 16 and 18. In its edge area facing the underside of the covering 51, the support screen 57 has holding devices which work together with protrusions on the underside of the covering 51 in a fastening manner.

The bus bars are attached to the trough-shaped bus bar support 54 by bus bar holders 53 inserted in and fixed in place on it, and the bus bar holders 53 have a lower part with cutouts for the bus bars 55 and an upper part placed thereon, which can be fixed in place by screws. A cover 56 at the front is provided for obtaining a touch-proof closure at the front, which also projects with an upper area over a laterally arranged bus bar holder 53.

In a distribution bus bar arrangement 50, the bus bar support with bus bars 55 arranged thereon and with the covering, as well as the device adapters, is attached to the mounting plates 40 extending vertically through several functional spaces, as described above. It is possible to mount the bus bar support 54 for the main bus bar arrangement 80 with the bus bars horizontally in the rear interior area. The connection between main bus bars and distribution bus bars 55 takes place by laminated copper rails and connecting clamps or bolts, or also by flexible conductors and connecting elements. Besides completely closed mounting plates, mounting plates with cutouts for passages are also provided for making the connection. The passages are closed off by cable bushings and/or insulating material.

Figure 19:
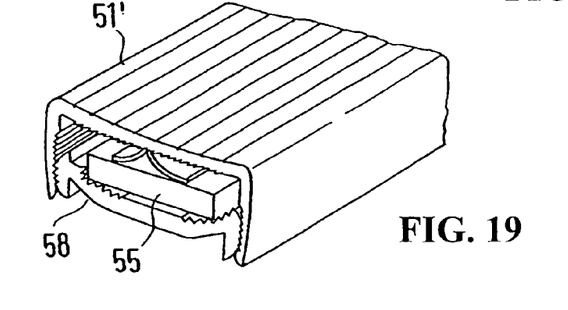
FIG. 19 shows an individual support of a bus bar with an individual cover.

FIG. 19 shows a single bus bar 55 received in an individual insulating receptacle 58, which is covered in a touch-proof manner with an individual covering 51. Here, the individual receptacle is placed in a snapped-in manner on lateral holding structures of the individual receptacle 58 by counter-structures arranged on the inside of lateral sections, and has a support on the inside for fixing the bus bar 55 in place on stepped receiving elements.

Figure 20:
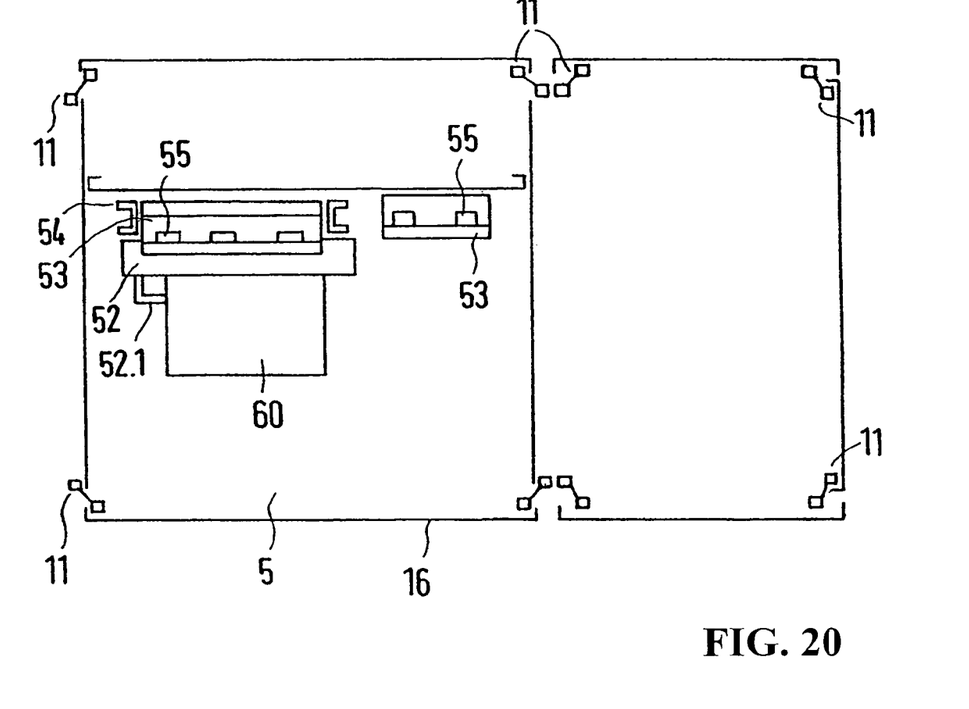
FIG. 20 shows a horizontal cross section of a switchgear cabinet arrangement on the level of a functional space.

FIG. 20 shows a representation similar to that of FIG. 5, however, a partial space arranged laterally next to the functional spaces 5, for example a cable maneuvering space, as well as the vertical frame legs 11 with inner and outer mounting planes, are represented in addition. A connector 52.1 is drawn in between the device component 60 and the device adapter 52. Also, the bus bar support 54 mounted on the mounting plate 40 with the bus bar holders 53 fixed in place on it is represented, such as also shown in FIG. 16. Also, a partial system of distribution bus bars with two distribution bus bars 55 is arranged on the mounting plate.

The described modular construction for the partial spaces in the interior of the switchgear cabinet permits a variable design along with simple assembly, by which heavy demands made on functional dependability are met, such as demanded in connection with low voltage installations.

The invention claimed is:

1. A switchgear cabinet arrangement, having at least one switchgear cabinet (2, 3, 4) which is dividable by wall sections into a plurality of cube-shaped functional spaces accessible from a front, the functional spaces including end vertical wall sections with horizontal divisions, wherein a bus bar arrangement, including a distribution bus bar arrangement (50), conducts electrical current to provide device components arranged in the functional spaces, with electrical energy, the switchgear cabinet arrangement comprising:

distribution bus bars (55) of the distribution bus bar arrangement (50) conducted through the functional spaces;

horizontal space divider floors (30) mounted in the interior of the spaces and covered in a touch-proof manner, the horizontal space divider floors (30) separating adjacent vertically arranged functional spaces; and the functional spaces having rear walls embodied as mounting plates (40) which are spaced apart from a rear wall of the respective switchgear cabinet (2, 3, 4) to form a reception space for a main bus bar arrangement (80) of the bus bar arrangement in the rear interior area of the switchgear cabinet, in which main bus bars are mounted which are electrically connected with the distribution bus bars (55);

wherein a connection between the main bus bars and the distribution bus bars (55) is provided by laminated copper bars and connecting clamps, by bolts, or flexible conductors and connecting clamps, the mounting plates have cutouts for passing the copper bars or flexible conductors through, and the cutouts are closed off by cable bushings or by insulating material.

2. The switchgear cabinet arrangement in accordance with claim 1, wherein the mounting plates (40) of a same height or a different height are provided and have dimensions of a height and a width matched to a second height and a second width of the functional spaces.

3. The switchgear cabinet arrangement in accordance with claim 2, wherein the partial spaces are closed off laterally by lateral wall sections (20) matched to the second height of the functional spaces.

4. The switchgear cabinet arrangement in accordance with claim 3, wherein cutouts (32) are arranged in a rear edge area of the space divider floors (30), through which the distribution bus bars (55) are conducted.

5. The switchgear cabinet arrangement in accordance with claim 4, wherein the cutouts (32) are matched to the extension of the area of the distribution bus bars (55) in a direction of a width and a depth, including the touch-protection covering (51, 51').

6. The switchgear cabinet arrangement in accordance with claim 5, wherein the distribution bus bar arrangement (50) is received in a trough-like support (54) having holding strips (54.1) extending along the vertical edges and is fixed in place by horizontally extending bus bar holders (53), and the covers (51), which are applied from the front, and are fixed in place on the holding strips (54.1) by lateral parts (51.1) having snap-in elements.

7. The switchgear cabinet arrangement in accordance with claim 6, wherein for receiving the space divider floors (30), mounting elbows (70) extending laterally in the depth direction are attached to the vertical frame legs (11) or the lateral sections or to the vertical mounting bars by vertical legs, and the space divider floors (30) are attached to horizontally oppositely oriented legs of two mounting elbows (70) located opposite each other at a same height.

8. The switchgear cabinet arrangement in accordance with claim 7, wherein the horizontal legs of the mounting elbows (70) project inward beyond oppositely directed insides of the front vertical frame legs (11), and a width of the space divider floors (30) at most corresponds to a clear distance between insides of the front vertical frame legs (11).

9. The switchgear cabinet arrangement in accordance with claim 8, wherein the functional spaces have at a front partial doors (16) matched to a height, or a front door extends over all functional spaces.

10. The switchgear cabinet arrangement in accordance with claim 9, wherein the height of at least one of the lateral wall sections (20), the mounting plates (40) or the partial doors (16), is matched to a grid measurement of rows of fastening holes in the vertical frame legs (11) or of the vertical mounting bars.

11. The switchgear cabinet arrangement in accordance with claim 1, wherein the partial spaces are closed off laterally by lateral wall sections (20) matched to a second height of the functional spaces.

12. The switchgear cabinet arrangement in accordance with claim 1, wherein cutouts (32) are arranged in a rear edge area of the space divider floors (30), through which the distribution bus bars (55) are conducted.

13. The switchgear cabinet arrangement in accordance with claim 12, wherein the cutouts (32) are matched to an extension of an area of the distribution bus bars (55) in a direction of a width and a depth, including the touch-protection covering (51, 51').

14. The switchgear cabinet arrangement in accordance with claim 1, wherein the functional spaces have at a front partial doors (16) matched to a height, or a front door extends over all functional spaces and is attached.

15. The switchgear cabinet arrangement in accordance with claim 14, wherein the height of at least one of lateral wall sections (20), the mounting plates (40) or the partial doors (16), is matched to a grid measurement of rows of fastening holes in the vertical frame legs (11) or of the vertical mounting bars.

16. A switchgear cabinet arrangement, having at least one switchgear cabinet (2, 3, 4) which is dividable by wall sections into a plurality of cube-shaped functional spaces accessible from a front, the functional spaces including end vertical wall sections with horizontal divisions, wherein a bus bar arrangement, including a distribution bus bar arrangement (50), conducts electrical current to provide device components arranged in the functional spaces, with electrical energy, the switchgear cabinet arrangement comprising:

distribution bus bars (55) of the distribution bus bar arrangement (50) conducted through the functional spaces; and horizontal space divider floors (30) mounted in the interior of the spaces and covered in a touch-proof manner, the horizontal space divider floors (30) separating adjacent vertically arranged functional spaces;

wherein the distribution bus bar arrangement (50) is received in a trough-like support (54) having holding strips (54.1) extending along the vertical edges and is fixed in place by horizontally extending bus bar holders (53), and the covers (51), which are applied from the front, and are fixed in place on the holding strips (54.1) by lateral parts (51.1) having snap-in elements.

17. The switchgear cabinet arrangement in accordance with claim 16, wherein the functional spaces have rear walls embodied as mounting plates (40) which are spaced apart from a rear wall of the respective switchgear cabinet (2, 3, 4) to form a reception space for a main bus bar arrangement (80) of the bus bar arrangement in the rear interior area of the switchgear cabinet, in which main bus bars are mounted which are electrically connected with the distribution bus bars (55).

18. The switchgear cabinet arrangement in accordance with claim 17, wherein a connection between the main bus bars and the distribution bus bars (55) is provided by laminated copper bars and connecting clamps, by bolts, or flexible conductors and connecting clamps, the mounting plates have cutouts for passing the copper bars or flexible conductors through, and the cutouts are closed off by cable bushings or by insulating material.

19. A switchgear cabinet arrangement, having at least one switchgear cabinet (2, 3, 4) which is dividable by wall sections into a plurality of cube-shaped functional spaces accessible from a front, the functional spaces including end vertical wall sections with horizontal divisions, wherein a bus bar arrangement, including a distribution bus bar arrangement (50), conducts electrical current to provide device components arranged in the functional spaces, with electrical energy, the switchgear cabinet arrangement comprising:

distribution bus bars (55) of the distribution bus bar arrangement (50) conducted through the functional spaces; and horizontal space divider floors (30) mounted in the interior of the spaces and covered in a touch-proof manner, the horizontal space divider floors (30) separating adjacent vertically arranged functional spaces, wherein for receiving the space divider floors (30), mounting elbows (70) extending laterally in a depth direction are attached to the vertical frame legs (11) or the lateral sections or to the vertical mounting bars by vertical legs, and the space divider floors (30) are attached to horizontally oppositely oriented legs of two mounting elbows (70) located opposite each other at a same height.

20. The switchgear cabinet arrangement in accordance with claim 19, wherein the horizontal legs of the mounting elbows (70) project inward beyond oppositely directed insides of the front vertical frame legs (11), and a width of the space divider floors (30) at most corresponds to a clear distance between insides of the front vertical frame legs (11).

21. The switchgear cabinet arrangement in accordance with claim 19, wherein a connection between the main bus bars and the distribution bus bars (55) is provided by laminated copper bars and connecting clamps, by bolts, or flexible conductors and connecting clamps, the mounting plates have cutouts for passing the copper bars or flexible conductors through, and the cutouts are closed off by cable bushings or by insulating material.

* * * * *